United States Patent [19]

Soot et al.

[11] Patent Number: 4,824,576
[45] Date of Patent: Apr. 25, 1989

[54] PROCESS FOR REMOVAL, SEPARATION AND RECOVERY OF HEAVY METAL IONS FROM SOLUTIONS USING ACTIVATED ALUMINA INCLUDING ACID TREATED ACTIVATED ALUMINA

[75] Inventors: Ajay Sood, Pittsburgh; Hubert L. Fleming, Lower Burrell; John W. Novak, Jr., New Kensington, all of Pa.

[73] Assignee: Aluminum Company of America, Pittsburgh, Pa.

[21] Appl. No.: 885,202

[22] Filed: Jul. 14, 1986

[51] Int. Cl.$^4$ ............................................... C02F 1/28
[52] U.S. Cl. .................................... 210/662; 210/670; 210/684; 210/688; 423/54
[58] Field of Search ............... 210/662, 670, 685, 688, 210/912, 913, 914, 684; 423/54

[56] References Cited

U.S. PATENT DOCUMENTS 2,413,184 12/1946 La Lande, Jr. ........................... 23/52
4,049,772 9/1977 Takada et al. .......................... 423/54
4,275,448 6/1981 Le Dall .................................. 210/662
4,454,044 6/1984 Klein ..................................... 210/913

OTHER PUBLICATIONS

George C. Cushnie, Jr., *Electroplating Wastewater Pollution Control Technology*, Park Ridge, N.J.: Noyes Publications, pp. 1-9, 30-37, and 48-54.
Jay A. Mackie et al., "The Alternatives", *Chemical Engineering*, Aug. 6, 1984, pp. 51-64.
W. Wesley Eckenfelder, Jr. et al., "Wastewater Treatment", *Chemical Engineering*, Sep. 2, 1985, pp. 60-74.

*Primary Examiner*—Ivars Cintins
*Attorney, Agent, or Firm*—Andrew Alexander; John P. Taylor

[57] ABSTRACT

An improved process is disclosed for the purification of an impure aqueous solution containing heavy metal ions which comprises passing the impure solution through a bed of activated alumina adsorbent. The heavy metal ions are removed from the impure aqueous solution by adsorption onto the activated alumina adsorbent. The adsorbent may be regenerated for reuse and the adsorbed metals recovered by subsequently stripping the metal ions from the adsorbent and recycling the metal ions back to the process of origin. The pH of the effluent may be monitored to determine when the capacity of the adsorbent has been reached and regeneration of the adsorbent should be commenced. In a preferred embodiment, a portion of the activated alumina is pretreated with acid before passing the impure solution through the adsorbent to enhance the chromium ion adsorption of the acid-treated activated alumina and a portion of the regenerated activated alumina is again treated with acid after each regeneration cycle.

27 Claims, 14 Drawing Sheets

METAL ION SEPARATION/RECOVERY PROCESS

PROCESS FOR REMOVAL, SEPARATION AND RECOVERY OF HEAVY METAL IONS FROM SOLUTIONS USING ACTIVATED ALUMINA INCLUDING ACID TREATED ACTIVATED ALUMINA

BACKGROUND OF THE INVENTION

1. Field of the Invention

This application relates to a process for purification of a solution. More particularly, this application relates to a process for removing heavy metal contaminants from a solution using an activated alumina adsorbent and optionally recovering the heavy metals.

2. Description of the Related Art

Historically, very little attention was paid to the disposal of industrial waste, due in part to lack of governmental regulation, and, more importantly, probably due to an overall lack of knowledge or appreciation by industry of the long term effects of industrial waste on people and the environment. Now, however, due both to government regulations and corporate responsibility, much attention has been addressed to proper handling and disposal of waste materials classified as hazardous or toxic.

Such materials include organics, heavy metals, cyanides, etc. Treatments for such materials include physical, chemical, biological, thermal, etc., depending upon the type of pollutant. Treatment of solutions containing heavy metals usually fall into the categories of physical and chemical. Most popular are the chemical treatments which treat the heavy metals to form compounds which will precipitate such as, for example, treatment with alkalies such as caustic soda or lime to form hydroxide precipitates or treatment with sulfur-containing compounds to form sulfides or sulfates.

Such methods for treating heavy metal pollutants are discussed in "Electroplating Wastewater Pollution Control Technology", by George C. Cushnie, Jr. published by Noyes Publications, Park Ridge, N.J. in 1985, at pp 1–9, 30–37, and 48–54; in an article published in Chemical Engineering on Aug. 6, 1984 at pp 51–64 entitled "Hazardous Waste Management: The Alternatives", by Mackie et al.; and in an article published in Chemical Engineering in September, 1985 at pp 60–74 entitled "Wastewater Treatment", by Eckenfelder, Jr. et al.

While such treatments work well for their intended purpose, i.e., to remove heavy metals from a plating solution or the like, they, in turn, create new problems. Conversion of heavy metal compounds to precipitates by neutralization, for example, as described in the aforementioned articles, forms hazardous sludge which must, in turn, be disposed of in an environmentally acceptable manner.

Other treatments have also been discussed for the removal of heavy metals from solutions such as electroplating solutions. Such methods, which are mentioned in the aforesaid Mackie et al. article on page 57, and the Eckenfelder Jr. et al. article on page 71, include: ion exchange, using caustic soda instead of lime to increase resin selectivity; activated-carbon adsorption: and reverse osmosis and evaporation.

SUMMARY OF THE INVENTION

It has now been discovered that activated alumina, particularly activated alumina which has been pretreated, possesses superior properties as an adsorbent for heavy metals present, for example, as contaminants in aqueous solutions. The metals may be separated, recovered and the adsorbent regenerated for future use.

It is therefore, an object of this invention to provide an improved process for the removal of heavy metal ions from an aqueous solution.

It is another object of this invention to provide an improved process for the removal of heavy metal ions from an aqueous solution using an adsorbent which comprises activated alumina.

It is yet another object of this invention to provide an improved process for the removal of heavy metal ions from an aqueous solution using an adsorbent which comprises activated alumina which has been pretreated with an acid resulting in higher adsorption capacity for some metal ions.

It is still another object of this invention to provide an improved process for the removal of heavy metal ions from an aqueous solution using a series of activated alumina adsorbent beds wherein the activated alumina in at least one of the beds has been pretreated with an acid resulting in higher adsorption capacity for some metal ions.

It is a further object of this invention to provide an improved process for the removal of heavy metal ions from an aqueous solution using an activated alumina adsorbent wherein the adsorbent may be regenerated by the removal and recovery of the adsorbed metals from the activated alumina adsorbent.

It is yet a further object of this invention to provide an improved process for the removal of heavy metal ions from an aqueous solution using an adsorbent containing activated alumina wherein the adsorbent may be regenerated by the removal and recovery of the adsorbed metals from the adsorbent and a portion of the regenerated activated alumina is retreated with acid.

Another object of the invention is to provide a process for the removal of heavy metal ions from an aqueous solution using an adsorbent containing activated alumina wherein the adsorbent may be regenerated by the removal of the adsorbed metals from the adsorbent and the dilute metal ion stream from the regenerated adsorbent is concentrated to expedite recovery of the metal values.

These and other objects of the invention will become apparent from the following description and accompanying drawings.

In accordance with the invention, an improved process for the purification of an impure aqueous solution containing heavy metal ions comprises passing the solution through a bed of adsorbent comprising activated alumina and stripping the adsorbent bed to recover the adsorbed metals and to regenerate the adsorbent. In a preferred embodiment, a portion of the activated alumina is pretreated with acid before passing the impure solution through the adsorbent and a portion of the regenerated activated alumina is again treated with acid after each regeneration cycle.

DETAILED DESCRIPTION OF THE INVENTION

Figure 1:
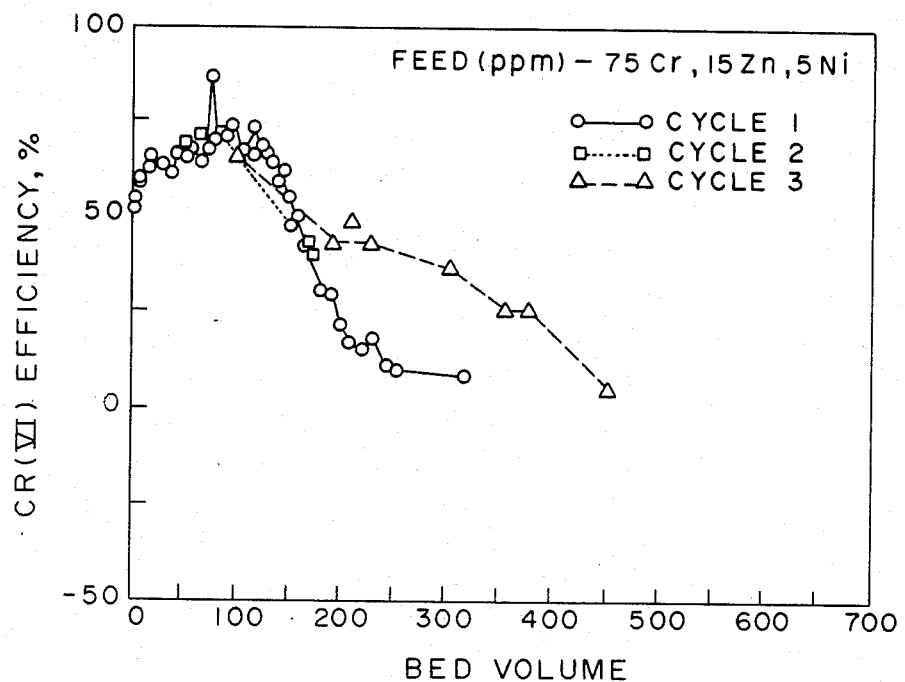
FIG. 1 is a graph plotting the efficiency of chromium removal from an activated alumina bed as a function of amount of heavy metal-containing solution containing 75 ppm chromium, 15 ppm zinc, and 5 ppm nickel passed through the bed.

In accordance with the invention, impure aqueous solutions containing heavy metals ions which are often present, for example in industrial waste waters from operations such as electroplating processes, may be purified by passing the impure solution through a bed of activated alumina adsorbent whereby the metal ions are adsorbed onto the activated adsorbent and then subsequently removed either for recycle or disposal in concentrated form during regeneration of the adsorbent.

Certain heavy metal ions are listed by the United States Environmental Protection Agency (EPA) as priority toxic pollutants. The heavy metal ions currently listed under EPA's priority pollutants list include the following metals and their compounds: antimony, arsenic, beryllium, cadmium, chromium, copper, lead, mercury, nickel, selenium, silver, thallium, tin, and zinc. A discussion of the toxicity, health impacts, and EPA's allowable limits for these heavy metals can be found on page 2 in "Priority Toxic Pollutants: Health Impacts and Allowable Limits", edited by Marshall Sittig, published by Noyes Publications, Park Ridge, N.J. in 1980.

Therefore, the-term "heavy- metal ions", as used herein, is intended to include any one or more of the above listed metals or their compounds, either singly or in any combination. Thus, the description of the invention using chromium, zinc, and nickel containing solutions is intended to be exemplary of the process without the intent to limit the invention to these three metals. It must be noted that the invention should work equally well with all the other heavy metals listed above. However, while the process of the invention may be used to remove any of the above listed heavy metals, i.e., antimony, arsenic, beryllium, cadmium, chromium, copper, lead, mercury, nickel, selenium, silver, thallium, tin and zinc; the process is preferably directed to the removal of arsenic, cadmium, chromium, copper, lead, mercury, nickel, selenium, silver and zinc; more preferably to the removal of arsenic, cadmium, chromium, copper, lead, nickel, selenium, silver and zinc; and most preferably to the removal of chromium, nickel and zinc.

It should be further noted that the process of the invention involves the simultaneous adsorption of anions such as $CrO_4^{2-}$ and cations such as $Ni^{2+}$ and $Zn^{2+}$ unlike prior art processes.

Moreover, the process of the invention eliminates the need for reducing hexavalent chromium to trivalent chromium with chemical reducing agents since the hexavalent chromium can be adsorbed on and desorbed from the activated alumina adsorbent directly. Current commercial practices require use of chemical reducing agents such as sulfur dioxide, sodium bisulfite, or sodium metabisulfite to reduce the chromium from the hexavalent to trivalent form after which the chromium is precipitated from the wastewater as chromium hydroxide by increasing the pH above 8.

The activated alumina useful in the process of this invention may comprise an alumina which has been activated by heating the alumina for at least one hour at 400°–500° C., preferably about 450° C. The activated alumina is characterized by a surface area greater than 250 m²/g, a pore volume greater than 0.4 cc/g, an average pore diameter of 60-100 Angstroms, 93 wt. % or higher $Al_2O_3$ content, a low $Na_2O$ content of 0.4 wt. % or less, a 4-8 wt. % loss on ignition (250°-1200° C.), a crush strength above 10 lbs, a loose bulk density of about 31 lb/ft³, and a packed bulk density of about 49 lb/ft³. Such an activated alumina is commercially available under the trademark SELEXSORB-M or CPN from the Aluminum Company of America. Other typical properties of such an activated alumina are shown below in Table I and FIGS. 18 and 19.

The particle size of the activated alumina adsorbent may range from about ¼ inch down to about −80 to +100 mesh (Tyler). The particles may be in granular form with variable shapes or of uniform shapes such as spheres. They may be prepared by a variety of forming processes such as ball forming in a pan-type agglomerator, agglomeration in a fluidized bed, extrusion, tabletting, or other similar techniques.

The activated alumina adsorbent may be used in packed beds in granular form in order to keep the pressure drop across the bed fairly low. Although the process of the invention will be so illustrated, it must be noted that, alternatively, the adsorbent may be used in a fluidized bed or in any other form which will permit contact between the adsorbent and the aqueous solution to be purified.

Aqueous solutions containing heavy metals may be purified, in accordance with one embodiment of this invention, by passing the solution through a packed bed of particulated activated alumina adsorbent. The flow rate of the solution through the packed bed should be adjusted to provide about 2 to 60 minutes, preferably about 20 minutes, of residence or contact time in the bed, i.e., the solution flow rate per hour should range from about 1 to 30 times the volume of the bed, preferably about 3 times the volume of the bed. Thus, if it is desired to increase the flow rate through the bed, the corresponding volume of the bed should be increased to maintain the residence time to insure adequate stripping of the heavy metals from the solution by the adsorbent.

This amount of contact time has been found to be sufficient to substantially remove all of the zinc and nickel metals typically present, for example, in wash water from plating baths, i.e., less than about 100-1000 ppm total metal ion concentration. When such a solution is processed in accordance with the invention, substantially all of these heavy metal ions in the solution are removed. The term "substantially all", as used herein, is intended to mean that the amount of the particular metal ion left in the solution after passing through the adsorbent bed is less than about 5 ppm. Preferably the amount of the particular metal ion left in the solution after passing through the adsorbent bed is less than about 1 ppm.

If a concentration of heavy metal ions in the solution to be purified is higher than, for example, 1000 ppm in a particular solution, the contact time may be increased by enlarging the volume of the bed or beds or, more simply, by decreasing the flow rate through the bed or beds to extend the residence time. Alternatively, the solution may be passed through the adsorbent bed one or more additional times. However, if an adequate residence time has been provided, additional passes through the adsorbent should be unnecessary.

In this regard it should be noted that it would be preferred, particularly in a continuous flow system, to monitor the effluent from the adsorbent bed to ensure that the desired adsorption is being carried out. Such monitoring means would also be helpful in ascertaining when the adsorption capacity of the bed has been reached as well as being useful in monitoring the regeneration of the bed as will be described. Such monitoring means may comprise a pH meter to determine or monitor the pH of the effluent since the pH of the effluent, at least under some conditions, tends to drop with increasing amount of impure solution processed through the bed, as will be illustrated and discussed below.

Alternatively, it may be desirable to directly monitor the concentration of metal ions remaining in the effluent using an ion sensitive electrode, colorimeter, atomic absorption spectrometer, an inductively coupled plasma, or other systems capable of detecting low level metal ion concentrations. As will be illustrated below, it has been found that chromium ions, which are normally found in higher concentrations than, for example, zinc or nickel in plating solution wash water, are not completely removed by the activated alumina adsorbent.

However, in accordance with one aspect of the invention, it has been discovered that substantially all of the chromium ions present in a typical plating bath wash solution may be removed if the activated alumina is pretreated with a dilute acid such as, for example, a mineral acid such as nitric, sulfuric, hydrochloric, carbonic, phosphoric, or hydrofluoric acid. The concentration of the acid should be kept low, preferably between about 0.01 to about 1 molar, more preferably about 0.1 molar, to preclude any substantial attack or degradation of the activated alumina by the acid.

As will be illustrated, however, quite surprisingly it was discovered that while such as acid pretreatment considerably enhanced the adsorption capabilities of the activated alumina for chromium ions, the adsorption capabilities of the activated alumina for other heavy metal ions such as zinc and nickel was depressed by such acid treatment.

Therefore, in accordance with a preferred embodiment of the invention, it has been proposed to use two activated alumina adsorbent beds in series, comprising one bed of activated alumina which has been pretreated with acid and another bed which has not been so treated.

Figure 2:
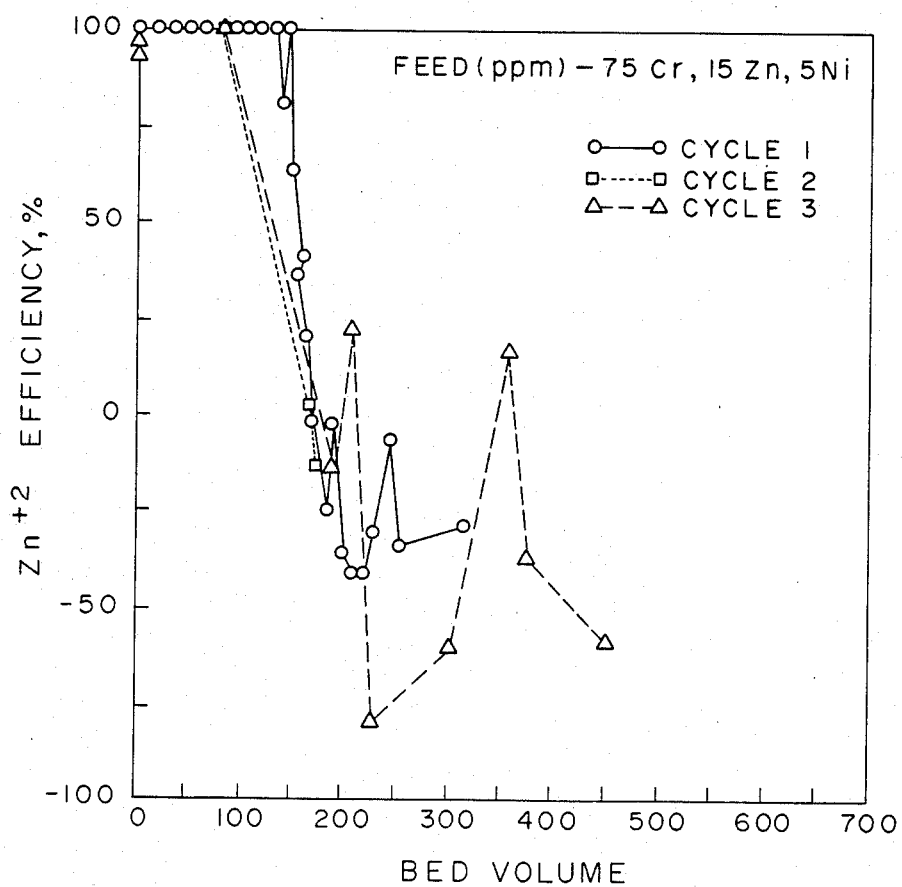
FIG. 2 is a graph plotting the efficiency of zinc removal from an activated alumina bed as a function of amount of heavy metal-containing solution containing 75 ppm chromium, 15 ppm zinc, and 5 ppm nickel passed through the bed.
Figure 3:
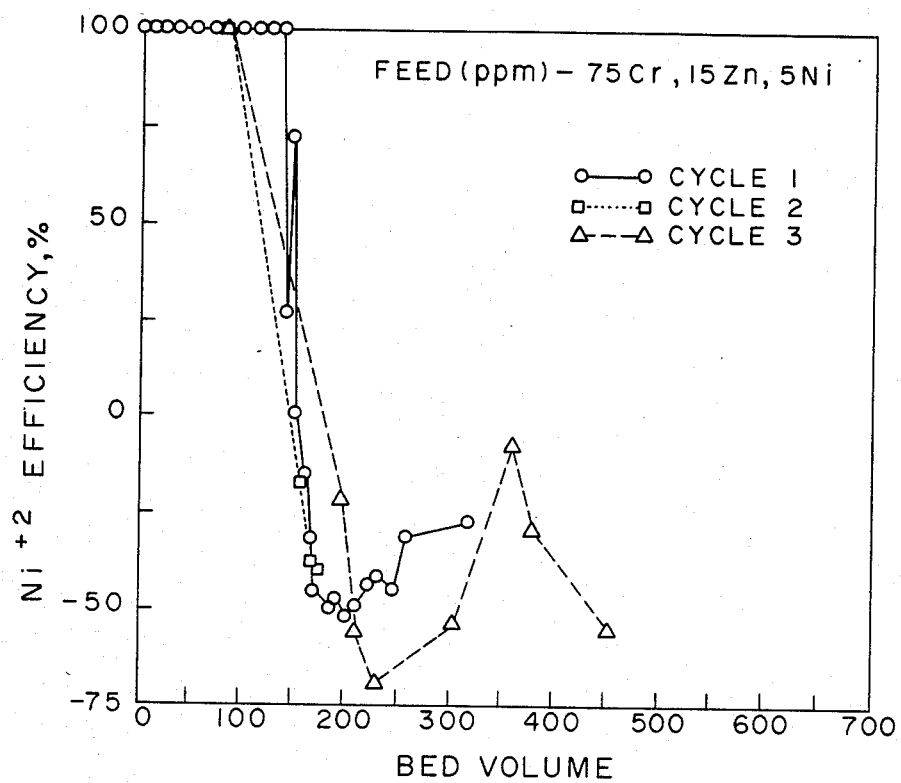
FIG. 3 is a graph plotting the efficiency of nickel removal from an activated alumina bed as a function of amount of heavy metal-containing solution containing 75 ppm chromium, 15 ppm zinc, and 5 ppm nickel passed through the bed.

Referring now to FIGS. 1-3, activated alumina, i.e., alumina heated to a dehydration temperature of approximately 450° C., was crushed to a particle size range of −14 to +28 mesh (Tyler) and packed in a one inch column to a height of 30 inches. An aqueous feed solution at room temperature (about 25° C.) containing 75 ppm chromium, 15 ppm zinc, and 5 ppm nickel was fed through the column at a rate of about 17 cc per minute to provide a residence time (expressed as empty bed contact time or EBCT) of about 20 minutes. The solution contained a multi-component mixture of anions ($CrO_4^{2-}$), and cations ($Zn^{2+}$ and $Ni^{2+}$).

FIGS. 1-3 plot the removal of the respective metal ions as a function of the amount of the solution passed through the column. It will be noted that, in each graph, there are three curves identified, respectively, as cycle 1, cycle 2, and cycle 3. Cycle 1 represents the results initially obtained while cycle 2 (and 3) represent results obtained after regeneration of the column as will be explained below.

From FIG. 1, it can be seen that the activated alumina bed was capable of giving less than 75% chromium removal efficiency. In other words, at least 25% of the chromium ions or greater than 19 ppm chromium appeared in the column effluent immediately. Right from the start, the chromium breakthrough in the column effluent was evident. The chromium removal efficiency dropped rapidly below 50% after 150 bed volumes.

From FIGS. 2 and 3, it can be seen that 100% removal efficiency for Zn and Ni was observed, at least for roughly 150 bed volumes, beyond which the removal efficiency dropped precipitously.

Figure 4:
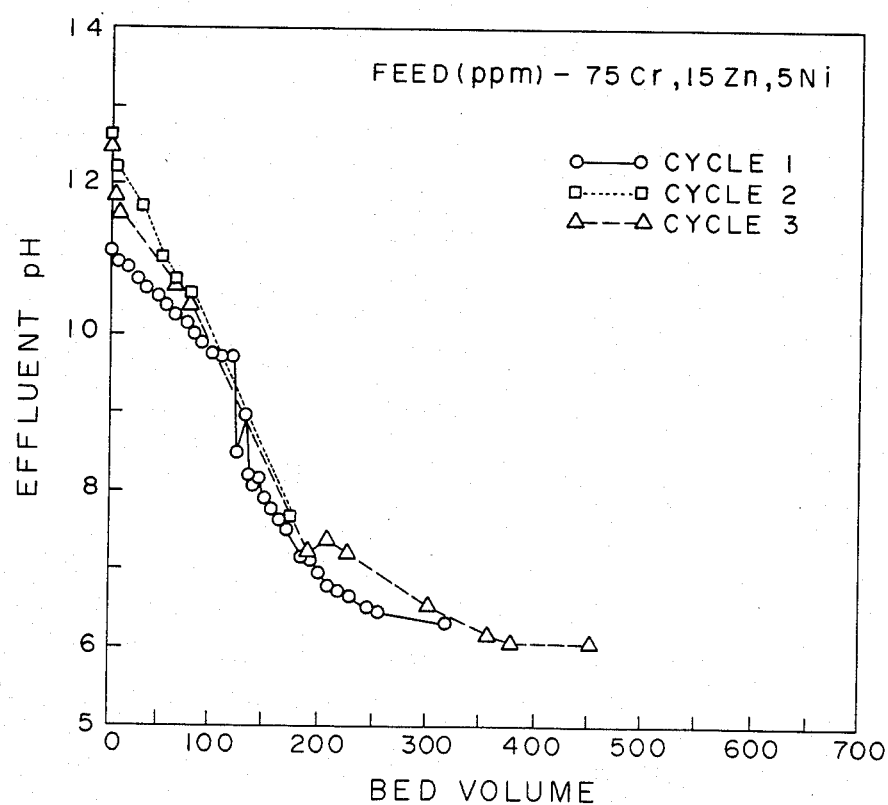
FIG. 4 is a graph plotting the pH of the effluent from an activated alumina bed as a function of amount of heavy metal-containing solution containing 75 ppm chromium, 15 ppm zinc, and 5 ppm nickel passed through the bed.

FIG. 4 is a plot showing the drop in pH during each cycle as more of the metal-containing solution is passed through the bed. It will be noted that a substantial drop in pH occurs at about the same time as the drop off in amount of zinc and nickel adsorbed, i.e., about 150 bed volumes of impure solution. This drop in pH can be used as a means to monitor the effectiveness of the adsorbent and the need to regenerate the bed as will be discussed below.

The adsorption characteristics of the activated alumina adsorbent were further determined using a lower concentration impure aqueous solution containing 15 ppm chromium, 5 ppm zinc, and 1 ppm nickel at a pH of about 4. This solution was also passed through thirty inches of a packed one inch diameter column as previously described, providing a residence time of about 20 minutes.

Figure 5:
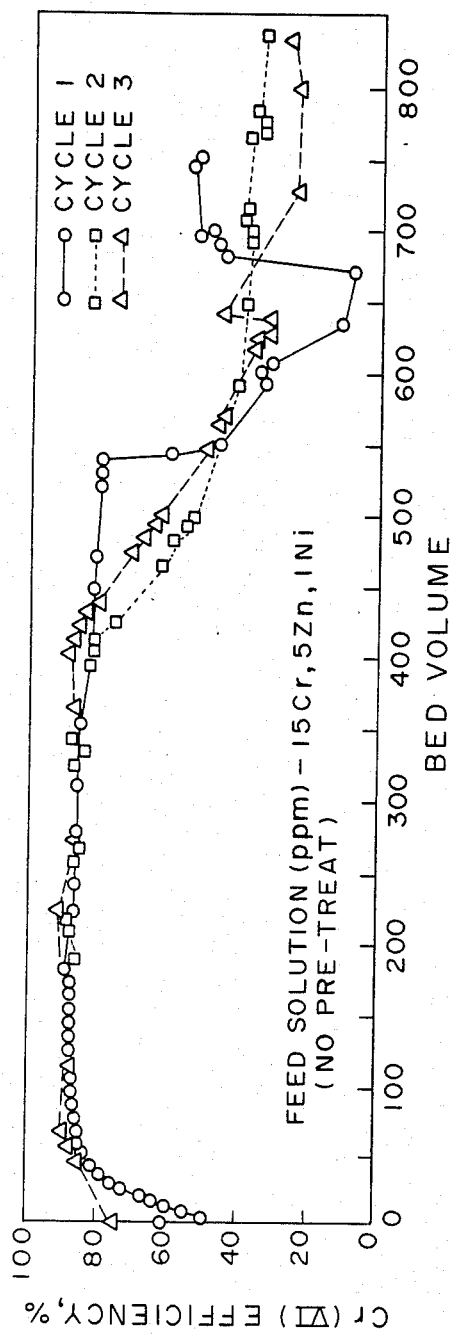
FIG. 5 is a graph plotting the efficiency of chromium removal from an activated alumina bed as a function of amount of heavy metal-containing solution containing 15 ppm chromium, 5 ppm zinc, and 1 ppm nickel passed through the bed.
Figure 6:
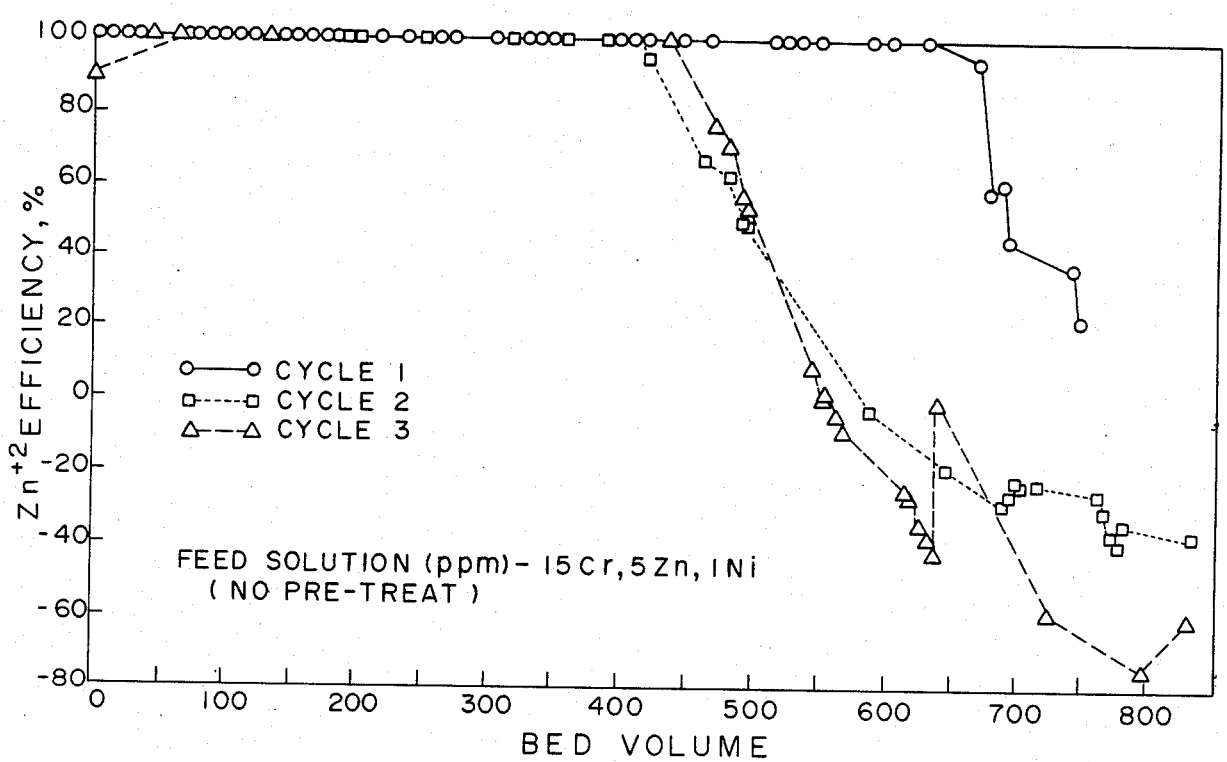
FIG. 6 is a graph plotting the efficiency of zinc removal from an activated alumina bed as a function of amount of heavy metal-containing solution containing 15 ppm chromium, 5 ppm zinc, and 1 ppm nickel passed through the bed.
Figure 7:
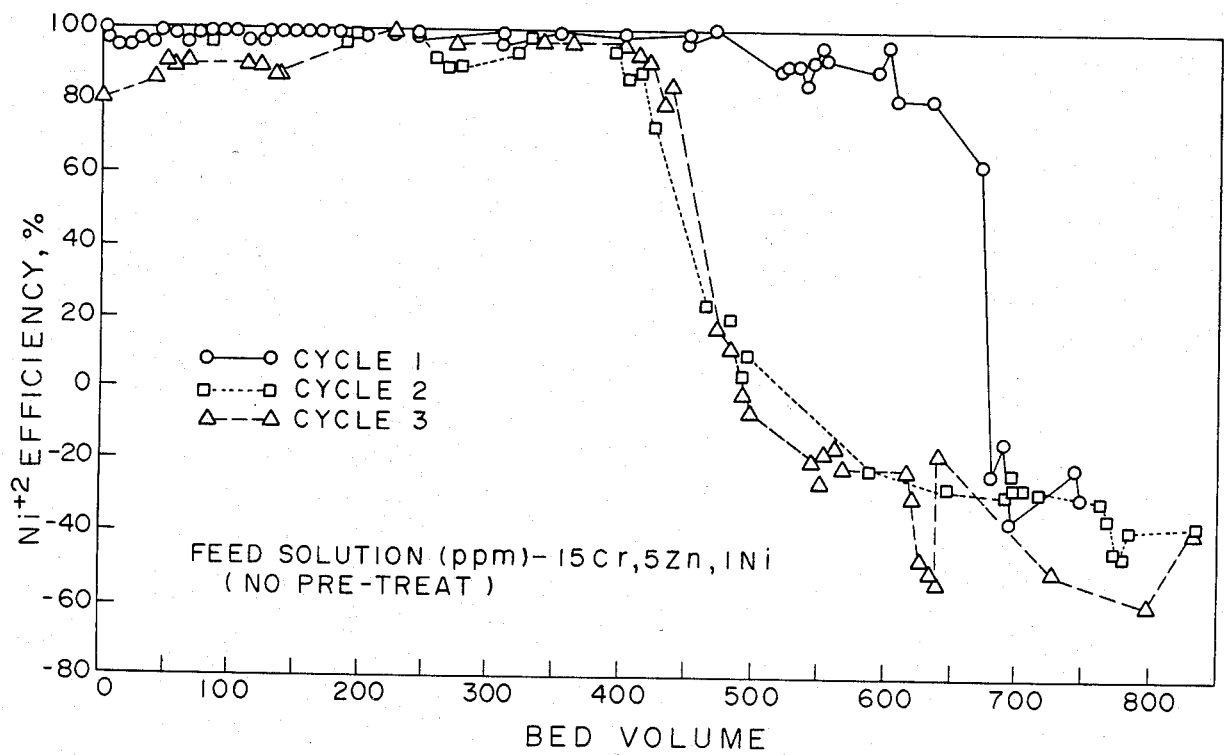
FIG. 7 is a graph plotting the efficiency of nickel removal from an activated alumina bed as a function of amount of heavy metal-containing solution containing 15 ppm chromium, 5 ppm zinc, and 1 ppm nickel passed through the bed.

The respective curves plotted in FIGS. 5-7 for chromium, zinc, and nickel adsorption indicate good adsorption of all three metals with virtually all of the zinc and nickel metals being substantially completely adsorbed over the first 400 bed volumes of solution passed through the column. FIG. 5 shows that, at this concentration of chromium in the solution, better than 80% is removed.

Figure 8:
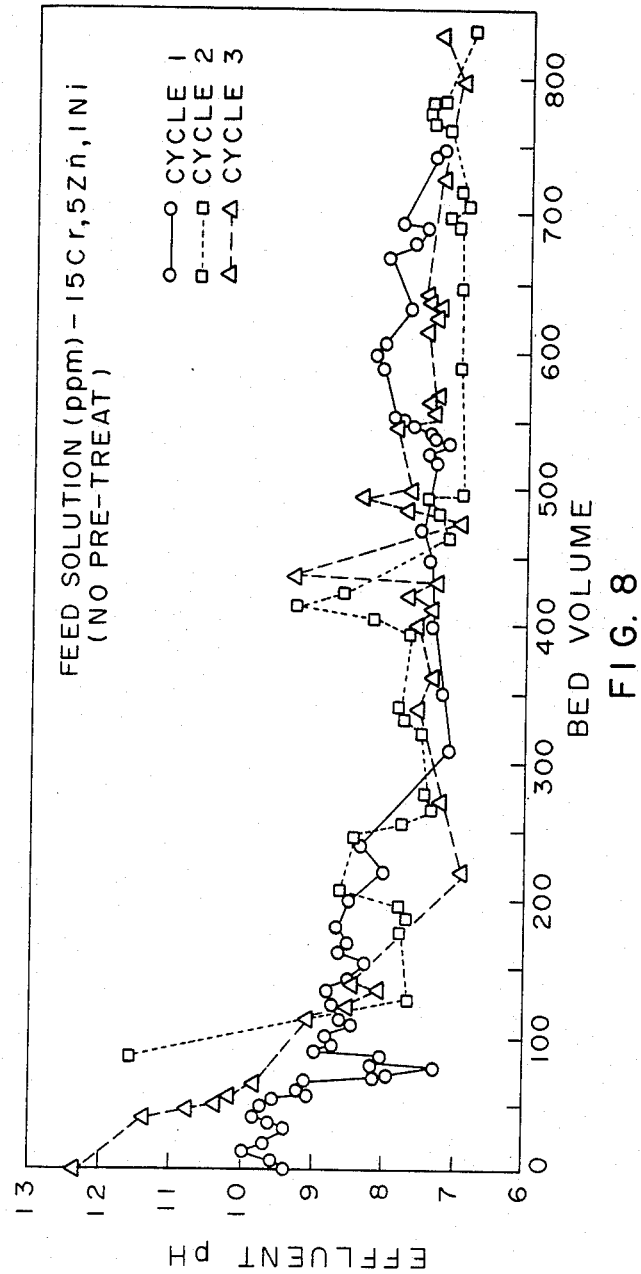
FIG. 8 is a graph plotting the pH of the effluent from an activated alumina bed as a function of amount of heavy metal-containing solution containing 15 ppm chromium, 5 ppm zinc, and 1 ppm nickel passed through the bed.

FIG. 8 indicates that there is a drop in pH of the effluent solution after about the first 100 bed volumes are passed through the column. However, after this, the pH appears to level off which may indicate that at low concentrations, the pH of the effluent may not be an adequate indicator of the remaining adsorption capacity of the bed. In instances where the effluent pH change may not be an adequate measure of the remaining capacity of the adsorbent, monitoring for effluent metal ion concentration, as previously discussed, may be more effective.

The capacity of the bed to effectively adsorb heavy metal ions from an aqueous solution is eventually reached after which stripping or regeneration of the activated alumina bed becomes advantageous and eventually necessary in accordance with the invention. Since this capacity has been demonstrated to be related, at least at high concentrations of metal ion impurities, to the above noted drop in pH, a pH meter may be used to monitor the effluent to thereby signal when the flow should be stopped and the adsorbent bed regenerated in accordance with the invention as discussed above.

Regeneration of the adsorbent may be accomplished by using a stripping flow or flush of an alkali metal hydroxide such as sodium hydroxide solution of about 1 wt. % or less concentration which may, preferably, be passed through the bed either countercurrent to the normal flow or in the same direction to strip the adsorbed heavy metal ions from the activated alumina adsorbent. While less concentrated amounts of stripping or regeneration agent may be used down to, for example, about 0.01 wt. %, such usage might extend the amount of stripping liquid which must be passed through the bed to substantially remove all of the adsorbed metals which, in turn, extends the regeneration time. Greater concentrations of alkali metal hydroxide beyond about 1 wt. % may attack and degrade the adsorbent material and, therefore, should be avoided.

Figure 9:
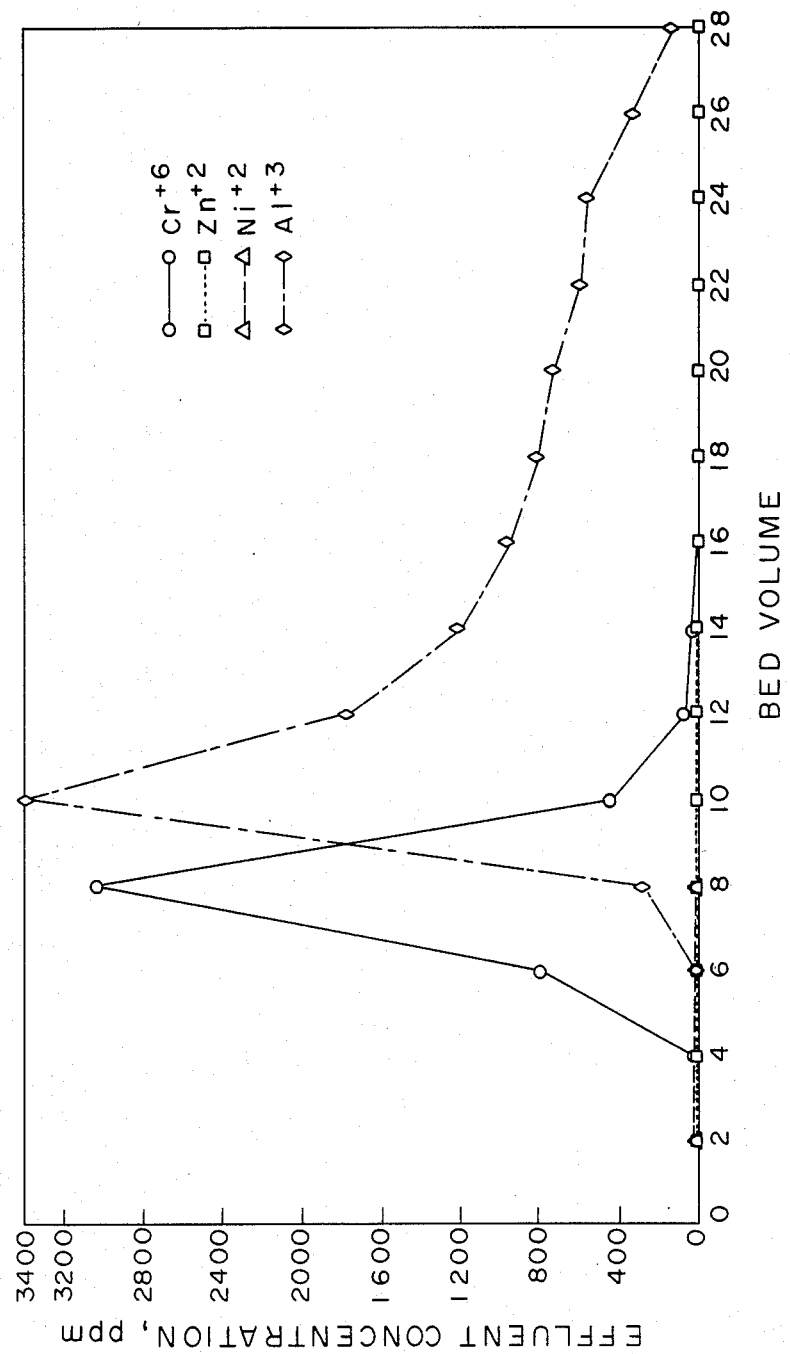
FIG. 9 is a graph plotting the concentration of heavy metals in the 1 wt. % NaOH regeneration effluent.
Figure 11:
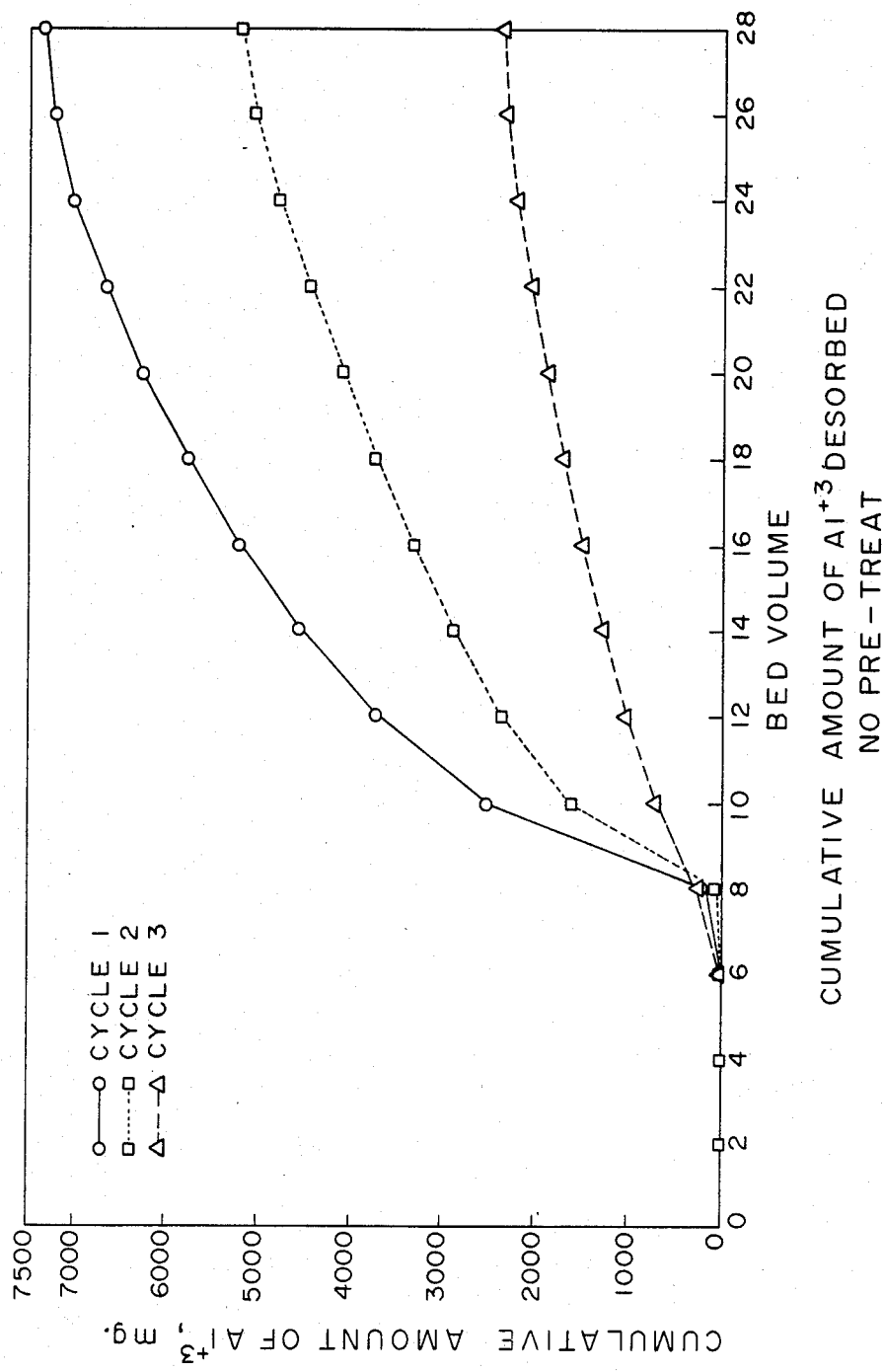
FIG. 11 is a graph plotting the cumulative amount (in milligrams) of aluminum ions in the stripping solution effluent with respect to volume of 1 wt. % NaOH passed through the adsorbent during three regeneration cycles.

FIGS. 9 and 11 illustrate the amount of aluminum ions present in the effluent of a 1 wt. % NaOH regeneration liquid. The amount of aluminum ions leached from the packed bed declines rapidly in successive cycles as shown in FIG. 11.

Figure 10:
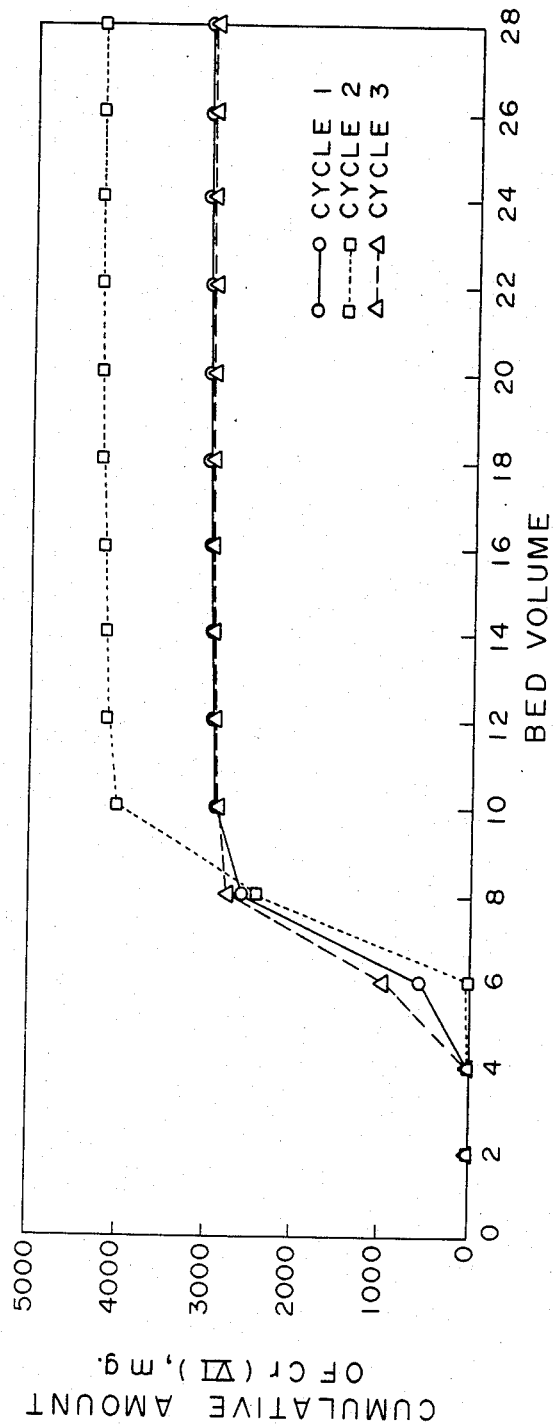
FIG. 10 is a graph plotting the cumulative amount (in milligrams) of chromium ions desorbed with respect to volume of 1 wt. % NaOH passed through the adsorbent during three regeneration cycles.

The amount of regeneration solution needed to effectively strip the bed will depend upon the volume of the bed and the amount of heavy metal ions adsorbed, as well as the concentration of the stripping liquid. As shown in FIG. 10, most of the metal impurities in an activated alumina bed may be removed by regeneration with about 4-6 bed volumes of a 1 wt. % sodium hydroxide solution. The three cycles shown in FIG. 10 represent three subsequent regeneration cycles after three adsorption cycles. A 20 minute contact time was used for the regeneration of the activated alumina bed. Generally, the flow rate and contact or residence time of the stripping solution in the bed should approximate that of the adsorption cycle.

As referred to earlier, preferably the effluent flow of regenerating or stripping solution is monitored to determine the progress of removal of the adsorbed metal ions from the activated alumina adsorbent. When substantially all the metal ion loading on the adsorbent has been removed by the regeneration solution, i.e., greater than 90% and preferably greater than 95%, it may be presumed that most of the metal ions removable with the particular regeneration material have been desorbed from the adsorbent bed.

FIGS. 9 and 10 illustrate the regeneration of an activated alumina bed with a 1 wt. % sodium hydroxide solution passed through the column with a 20 minute contact time. It will be noted that a peak in chromium concentration in the regeneration effluent occurs at about 7-8 bed volumes of regeneration solution with a drop at about 10 bed volumes and a tapering down to almost nothing thereafter.

Other stripping materials can be used such as, for example, about 5 wt. % sodium carbonate. However, when sodium carbonate is used, only the chromium is stripped from the material with very little zinc or nickel removed. It should be noted, however, that the chromium capacity of the materials used in the process of the invention is reached considerably sooner than the zinc or nickel capacity which provides at least limited utility for a stripping or regeneration agent which only removes chromium. Furthermore, it may be of interest to selectively remove only one metal for purposes of recovery and recycling of the particular metal.

Figure 12:
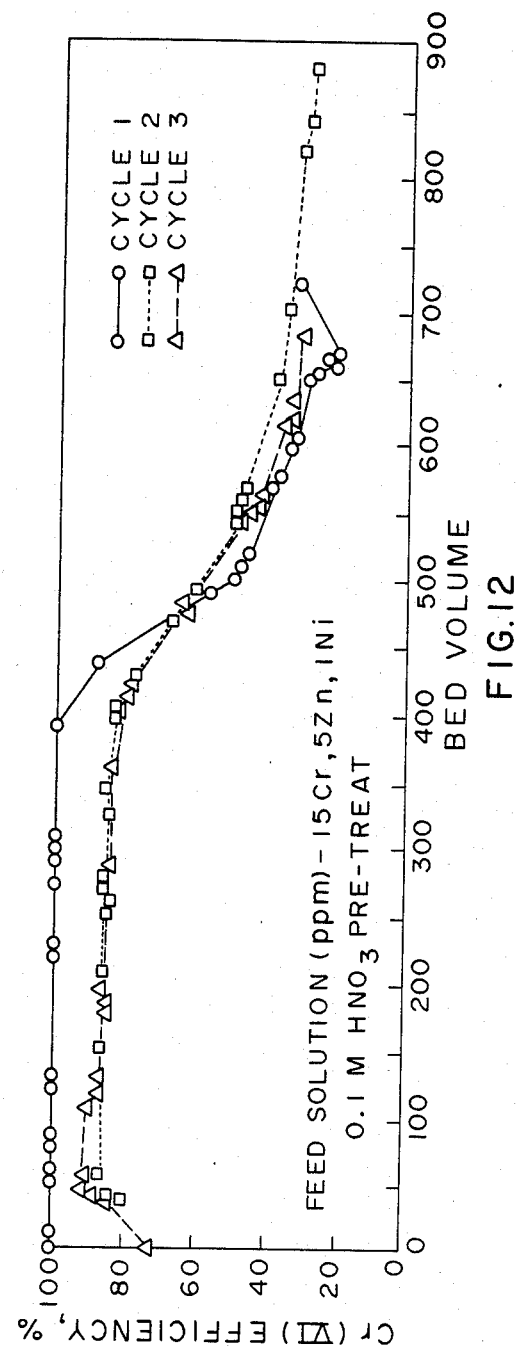
FIG. 12 is a graph plotting the efficiency of chromium removal from an activated alumina bed pretreated with 0.1 molar nitric acid as a function of amount of heavy metal-containing solution passed through the bed.
Figure 13:
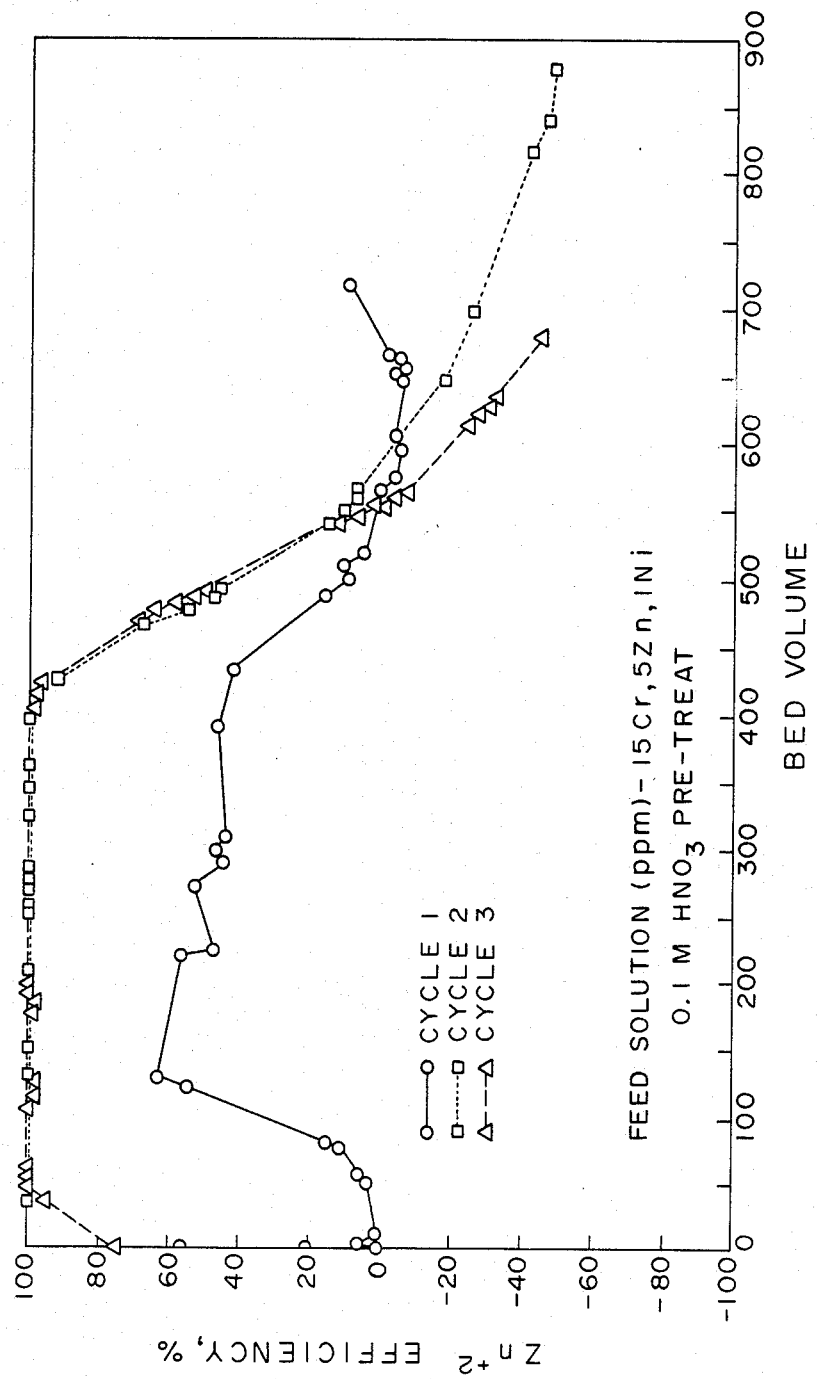
FIG. 13 is a graph plotting the efficiency of zinc removal from an activated alumina bed pretreated with 0.1 molar nitric acid as a function of amount of heavy metal-containing solution passed through the bed.
Figure 14:
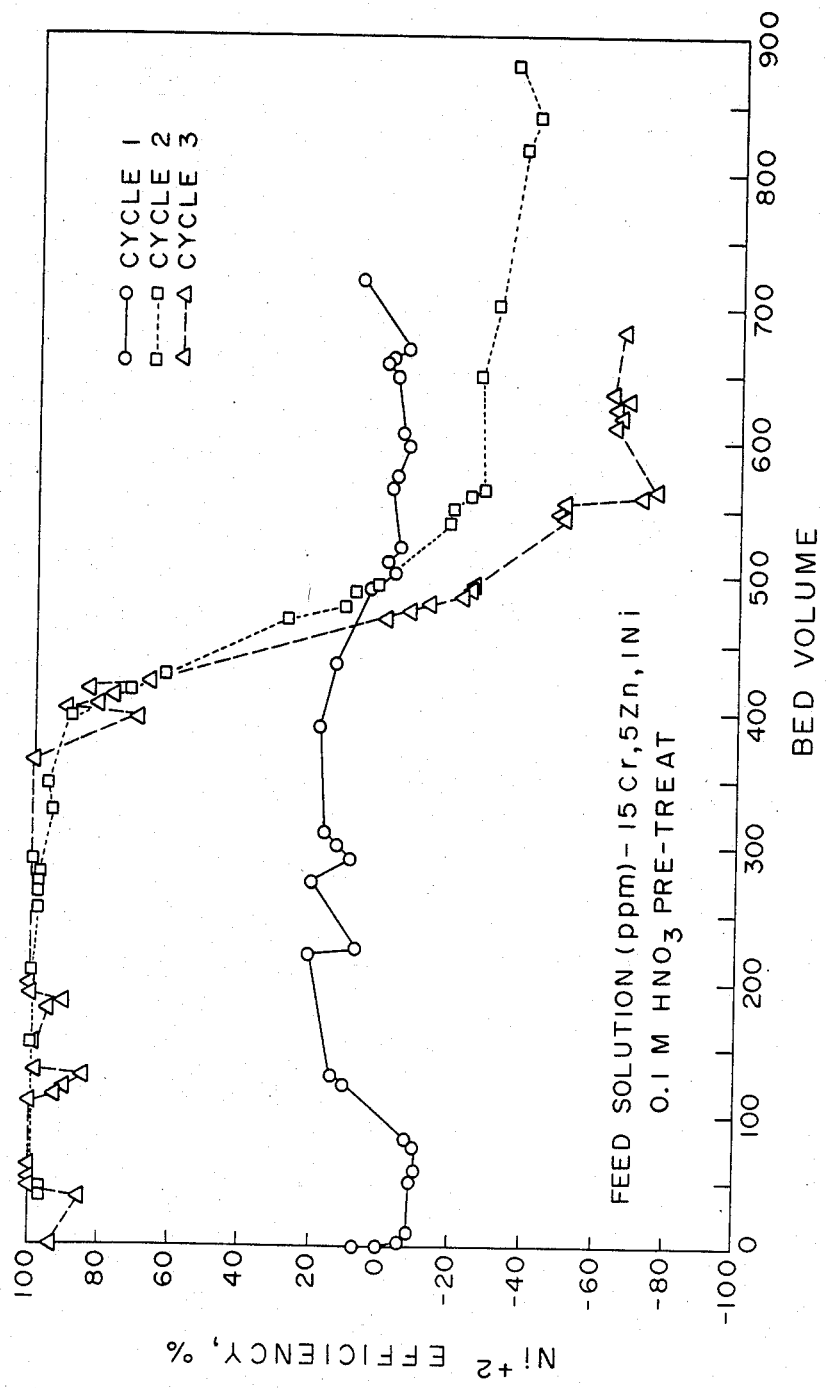
FIG. 14 is a graph plotting the efficiency of nickel removal from an activated alumina bed pretreated with 0.1 molar nitric acid as a function of amount of heavy metal-containing solution passed through the bed.

Referring now to FIGS. 12-14, an activated alumina bed comprising thirty inches of a packed one inch diameter column as previously described was pretreated with acid by passing 1-5 bed volumes of 0.1 molar nitric acid through the bed. The pretreated activated alumina bed was then used as an adsorbent by passing through the bed a solution containing 15 ppm chromium, 5 ppm zinc, and 1 ppm nickel at a pH of about 4 under the same conditions as described with respect to FIGS. 5-7.

It will be noted, with respect to the curve in FIG. 12 identified as the first cycle, that the removal of chromium ion was essentially complete for the first 400 bed volumes of the impure solution passed through the bed. In contrast, it will be noted, still referring to FIG. 12, that the curves representing the second and third cycles, i.e., after successive regenerations, do not show the same degree of chromium ion adsorption. This is believed to be because the activated alumina was not again pretreated with acid after each regeneration.

Referring to FIGS. 13 and 14, it will be surprisingly noted that the effect of the acid pretreatment on the adsorption of either zinc or nickel is adversely affected with the curve representing cycle 1 again reflecting the effect of the acid pretreatment. The other curves respectively illustrate the enhanced adsorption of zinc and nickel respectively during the second and third cycles when acid pretreatment did not occur again after regeneration and before commencement of the second or third cycles.

Figure 15:
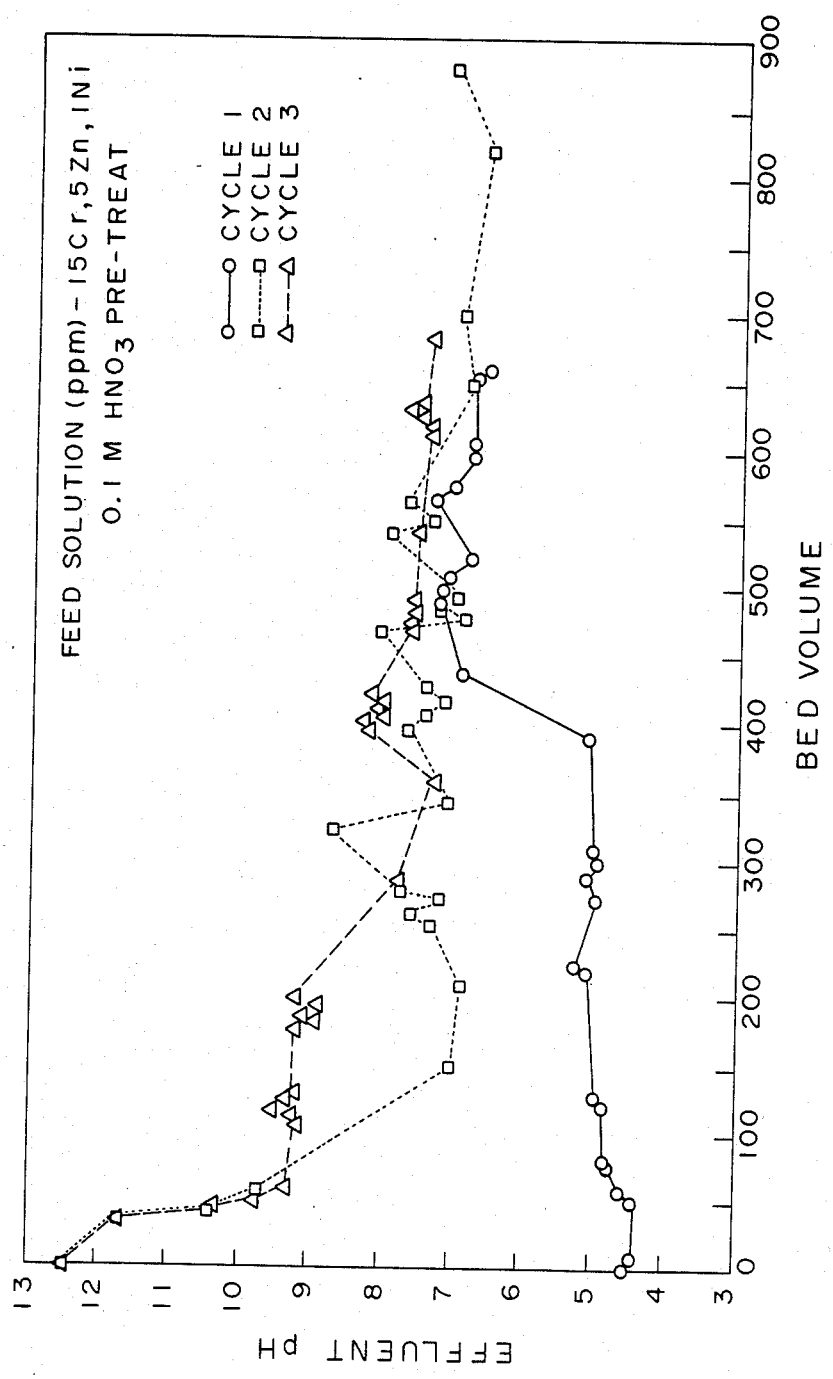
FIG. 15 is a graph plotting the pH of the effluent from an activated alumina bed pretreated with 0.1 molar nitric acid as a function of amount of heavy metal-containing solution containing 15 ppm chromium, 5 ppm zinc, and 1 ppm nickel passed through the bed.

Referring to FIG. 15 which plots the pH of the effluent from the adsorption runs, it will be noted that the pH of the effluent, with respect to total bed volumes of impure solution passed through the bed, differs markedly between the first cycle, representing the acid pretreatment, and the second and third cycles in which there was no acid pretreatment after regeneration.

Thus it appears that the acid pretreatment, while increasing the adsorption effectiveness of the activated alumina with respect to chromium, adversely affects the ability of the activated alumina to adsorb zinc or nickel. While we do not wish to be bound by any theory of operation, it appears that this acid treatment may be somehow changing the surface of the activated alumina to thereby enhance chromium adsorption to the detriment of the zinc or nickel adsorption.

Figure 16:
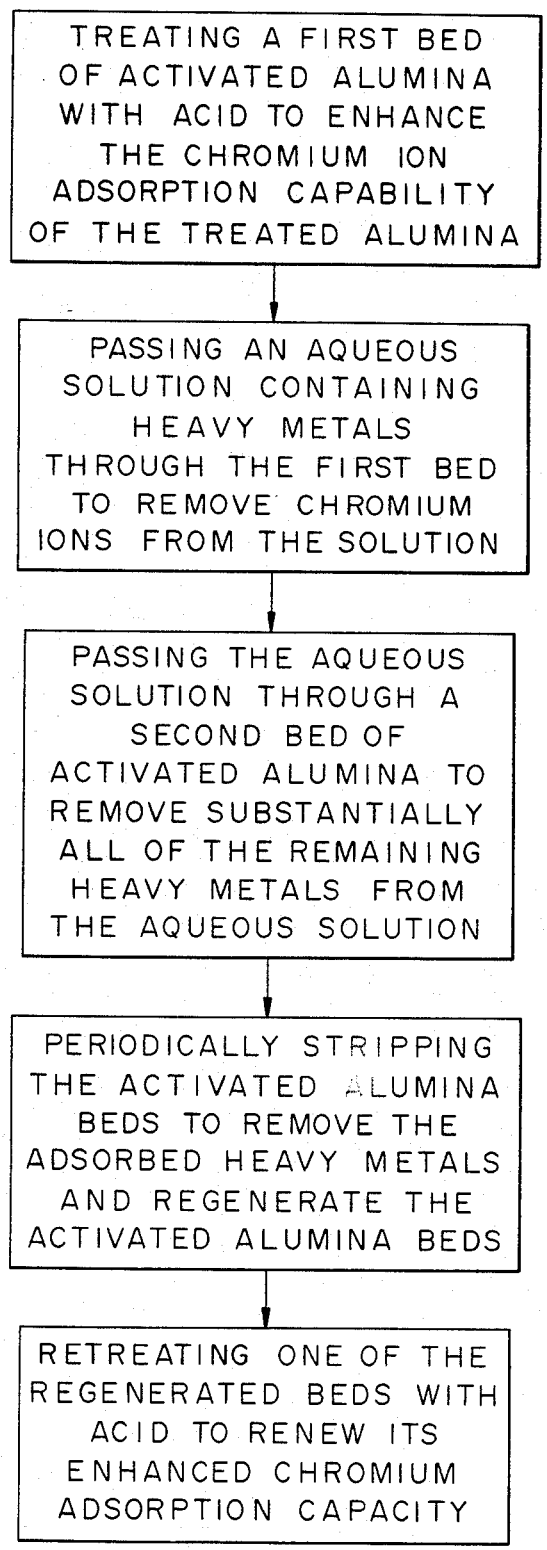
FIG. 16 is a process outline illustrating the process of the invention.
Figure 17:
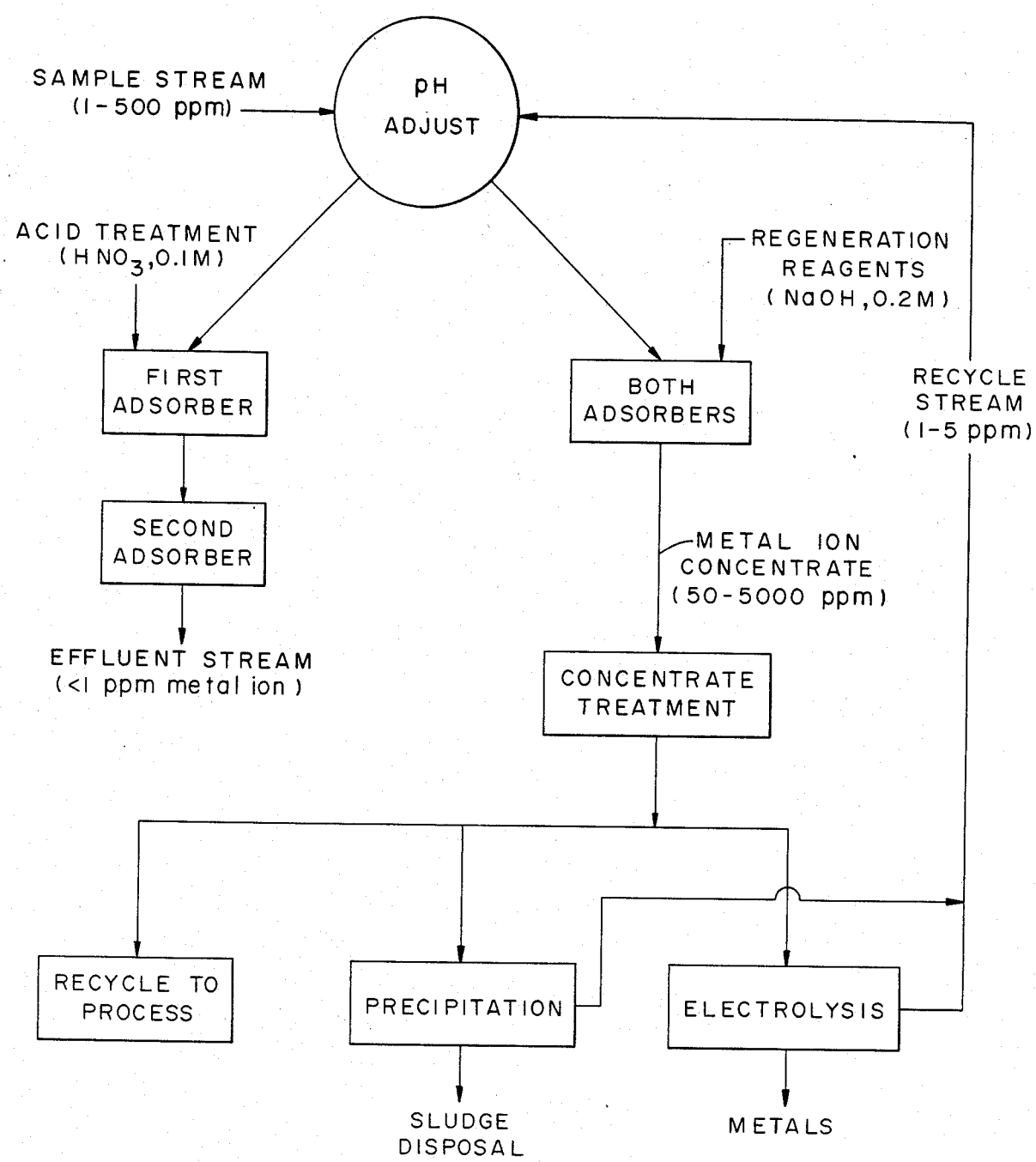
FIG. 17 is a detailed flow sheet illustrating the process of the invention including metal ion separation and/or metal recovery.

In view of these results, and in accordance with a preferred embodiment of the invention, it has been proposed to use two activated alumina beds in series wherein one bed would be initially pretreated with acid and then again pretreated with acid after each regeneration, to thereby optimize the adsorption of chromium ions. The other bed of activated alumina will not be pretreated with acid to thereby provide, in this second bed, an optimum adsorption of other heavy metal ions such as zinc and nickel as shown in FIGS. 16 and 17. Alternatively, if desired, activated alumina which has been pretreated with acid may be mixed with non-acid treated activated alumina in the same bed.

The process of the invention also comprises optional recovery of the metals adsorbed on the adsorbent as a high metal ion concentrate obtained by desorption during the regeneration of the adsorbent. The metal ion concentrate can be used to recover metal values present by any one of three techniques as illustrated in FIG. 17. In the first method, metal values are recovered by electrolysis. In the second method, the metals can be precipitated by conventional technology (i.e., evaporation) to form a sludge which is then disposed of in an environmentally safe manner. The third method involves recycle of the metal concentrate back to the process generating the pollutant stream. For example, in the case of electroplating effluents, the metal concentrate may be recycled to the electroplating bath. Electrolysis or recycle of the metal concentrate to the process are the preferred embodiments of the recovery portion of the invention since they do not produce a sludge.

Figure 18:
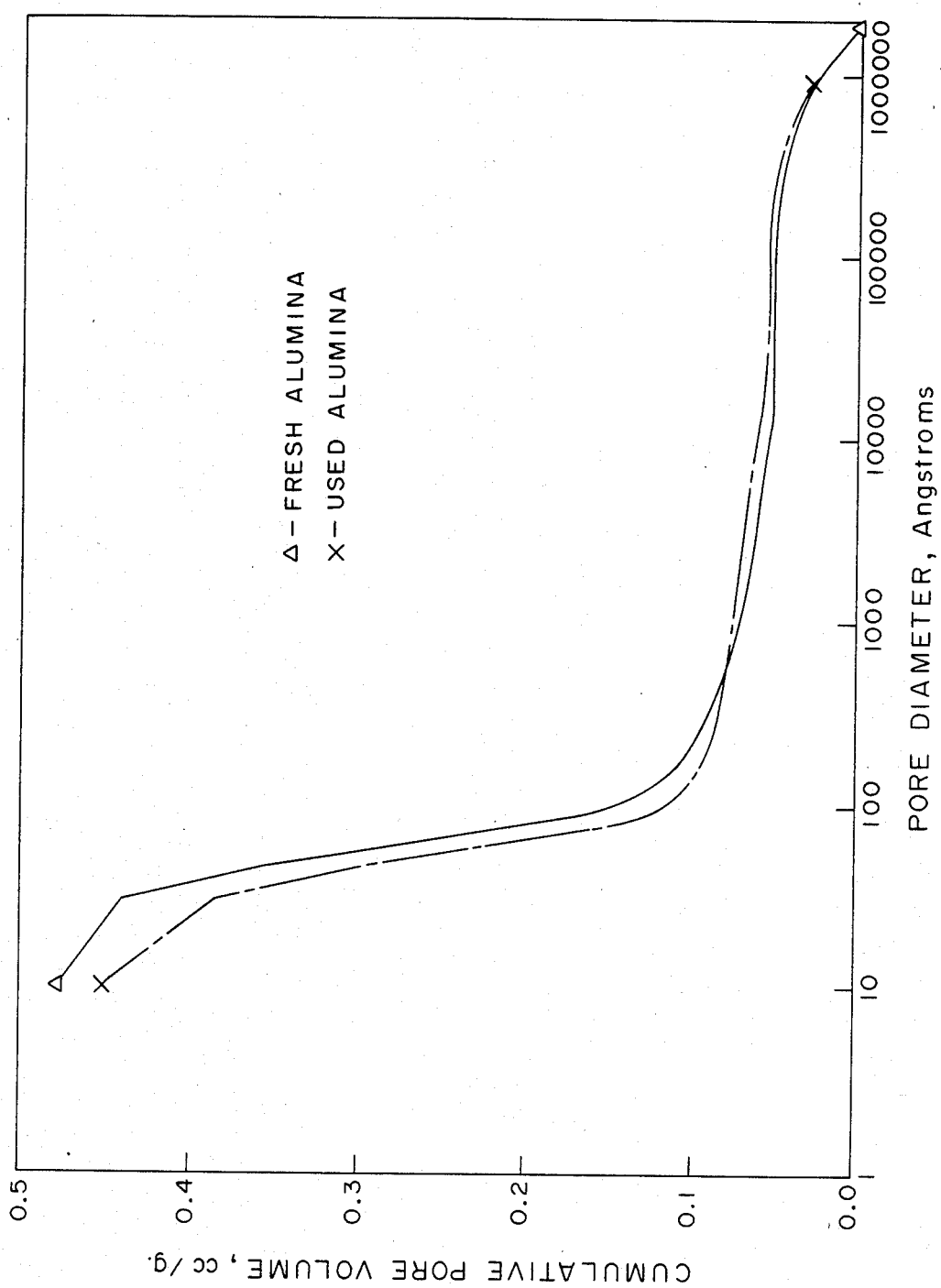
FIG. 18 is a graph showing a comparison of the cumulative pore volume distributions vs. pore diameters for fresh and used activated alumina.
Figure 19:
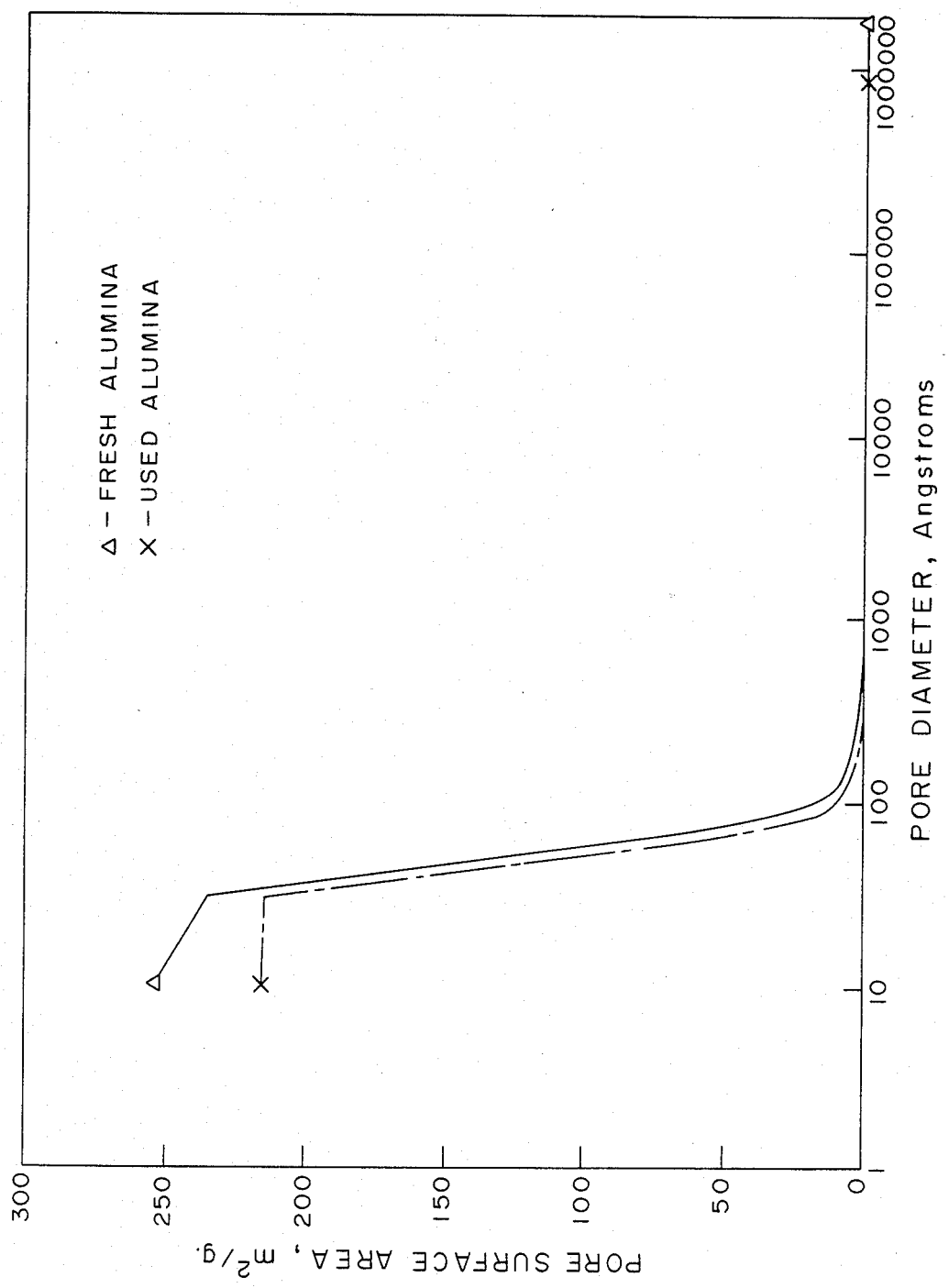
FIG. 19 is a graph showing a comparison of the pore surface area distributions vs. pore diameters for fresh and used activated alumina.

The regenerated activated alumina does not show any deterioration of adsorptive properties, even after three adsorption and desorption cycles. The cumulative pore volume and surface area distributions of the fresh and regenerated activated alumina are shown in FIGS. 18 and 19, respectively. The regenerated alumina is the material which had gone through three adsorption and desorption cycles as described with respect to FIGS. 5 to 11. The alumina material was removed from the column and dried for 110° C. for 24 hours before performing the porosity measurements. The plots show that there was only a slight shift in the cumulative pore volume and surface area distributions between the fresh and regenerated alumina.

More information on the fresh and regenerated activated alumina adsorbent is presented in Table I below. It will be seen that the regenerated alumina had a slight decrease in surface area from 254 to 215 $m^2/g$ and total pore volume from 0.48 to 0.45 cc/g. The reduction in surface area and pore volumes is very small, especially considering that the alumina has gone through three adsorption cycles, each cycle handling roughly 900 bed volumes of feed for a total of 2,700 bed volumes of influent equivalent to 38 days of continuous operation.

The reason for the slight decrease in surface area and pore volume was probably the method of regeneration used for desorbing the metal species. The alumina regeneration was done with 1 weight percent sodium hydroxide solution. Even though the caustic solution was in contact with the bed for a short time (20 bed volumes or 6.7 hours for each regeneration cycle), some aluminum metal ions were leached out of the bed by the strong caustic solution. The aluminum leaching is shown clearly in FIGS. 9 and 11. The amount of total aluminum leached declines rapidly from a high of 27 mg/g in the first desorption cycle to 9 mg/g in the third cycle. Hence it is likely that the alumina bed will last a long time. Moreover, the concentration of the caustic used for regeneration can be reduced, as well as the time it is in contact with the alumina, in order to reduce the bed volume losses.

The caustic solution is very effective in desorbing all the metal species from the alumina bed as shown in Table I. The regenerated alumina bed, which has gone through three adsorption and desorption cycles, had negligible metal loadings left on it of 0.01 ppm Cr, 0.67 ppm Zn, and 0.15 ppm Ni.

TABLE I

| Comparison of Fresh and Regenerated Activated Alumina Adsorbent Properties | | |
|---|---|---|
| Property | Fresh Adsorbent | Regenerated Adsorbent |
| BET Surface Area, $m^2/g$ | 254 | 215 |
| Apparent Density, cc/g | 2.79 | 2.60 |
| Micropore Volume, cc/g (pores less than 30 Angstroms) | 0.04 | 0.07 |
| Macropore Volume, cc/g (pores greater than 30 Angstroms) | 0.44 | 0.38 |
| Total Pore Volume, cc/g | 0.48 | 0.45 |
| Average Pore Diameter, Angstroms | 72 | 75 |
| Elemental ICP Analysis | | |
| Cr, ppm | 0.0 | 0.01 |
| Zn, ppm | 0.0 | 0.67 |
| Ni, ppm | 0.0 | 0.15 |

Thus the invention provides a process for purifying an impure aqueous solution containing heavy metal ions which comprises passing the impure solution through one or more beds containing activated alumina to cause the heavy metal ions in the solution to be adsorbed out of the solution onto the activated adsorbent. When the capacity of the adsorbent to adsorb metal ions is reached, the activated alumina adsorbent material may be regenerated and the metal ions recovered and recycled back for reuse in the process of origin of the impure solution or else suitably disposed of. Activated alumina which has been pretreated with acid may be used in whole or in part to enhance the adsorption of chromium ions present in the impure solution.

The invention thus provides a cyclic process with adsorption and desorption with capacities for optimized specific metal adsorption on the activated alumina adsorption material and capability to regenerate to regain substantially all of the adsorption capacity. The metals may be recovered as metals or metal salts for either recycling or disposal with the reduction in stream volume resulting from the concentration resulting in less material which must be hauled away if recycling is not desired or feasible. Furthermore, production and disposal of hazardous sludges is avoided by the process.

Having thus described the invention, what is claimed is:

1. An improved process for the purification of an impure aqueous solution containing chromium ions and other heavy metal ions which comprises passing the solution through an activated alumina adsorbent bed, at least a portion of which has been treated with acid to enhance chromium adsorption of said activated alumina, to cause heavy metal ions, and substantially all of said chromium ions present, to be removed from the impure aqueous solution by adsorption onto the activated alumina adsorbent.

2. The process of claim 1 wherein the particle size of said activated alumina adsorbent ranges from as small as +100 mesh (Tyler) to as large as about ¼ inch in diameter.

3. The process of claim 2 wherein said step of passing said impure aqueous liquid through said activated alumina adsorbent further comprises passing said liquid through said adsorbent at a rate sufficient to provide a contact time of about 2 to 60 minutes in said activated alumina adsorbent bed.

4. The process of claim 3 wherein said step of passing said impure aqueous liquid through said activated alumina adsorbent further comprises passing said liquid through said adsorbent at a rate sufficient to provide a contact time of about 20 minutes in said adsorbent bed.

5. The process of claim 3 including the further step of periodically removing said adsorbed heavy metal ions from said activated alumina adsorbent to regenerate said adsorbent.

6. The process of claim 5 wherein said step of periodically removing said adsorbed heavy metal ions to regenerate said activated alumina adsorbent further comprises passing a stripping solution through said adsorbent.

7. The process of claim 6 wherein said step of periodically removing said adsorbed heavy metal ions from said activated alumina adsorbent to regenerate said adsorbent further includes monitoring the effluent from said adsorbent to determine when regeneration of said adsorbent is needed.

8. The process of claim 7 wherein said step of monitoring said effluent from said adsorbent further comprises monitoring the pH of said effluent.

9. The process of claim 8 wherein said steps of monitoring the pH of said effluent and regenerating said adsorbent further comprises commencing said step of regeneration when the pH of said effluent reaches a predetermined level indicative of the capacity of the adsorbent.

10. The process of claim 9 wherein said step of removing said adsorbed heavy metal ions from said activated alumina adsorbent includes the further step of monitoring said stripping solution to determine when substantially all of said heavy metal ions have been removed from said activated alumina adsorbent.

11. The process of claim 7 wherein said step of monitoring said effluent from said adsorbent further comprises monitoring the metal ion concentration of said effluent.

12. The process of claim 6 wherein said step of removing said heavy metals from said activated alumina adsorbent comprises passing a stripping solution selected from the class consisting of alkali metal hydroxides and alkali metal carbonates through said adsorbent material to recover said adsorbed heavy metals and to regenerate said activated alumina adsorbent.

13. The process of claim 12 wherein said step of removing said heavy metals from said activated alumina adsorbent comprises passing a solution of not greater than 1 wt. % sodium hydroxide through said activated alumina adsorbent.

14. The process of claim 1 including the further step of periodically removing said adsorbed heavy metal ions from said activated alumina adsorbent to regenerate said adsorbent.

15. The process of claim 14 wherein said step of periodic removal of said heavy metal ions from said adsorbent includes the steps of:
(a) monitoring the effluent from said adsorbent to determine when regeneration of said adsorbent is needed;
(b) passing a stripping solution through said adsorbent material selected from the class consisting of alkali metal hydroxides and alkali metal carbonates to recover said adsorbed heavey metal and to regenerate said activated alumina adsorbent; and
(c) monitoring said stripping solution to determine when substantially all of said heavy metal ions have been removed from said activated alumina adsorbent.

16. A process for purifying an aqueous solution containing chromium ions and one or more metals ions selected from the class consisting of antimony, arsenic, beryllium, cadmium, chromium, copper, lead, mercury, nickel, selenium, silver, thallium, tin, and zinc by adsorbing the metal ions from the solution and recovering the metal which comprises:
(a) treating a first bed of activated alumina adsorbent with acid to enhance the chromium adsorption capacity of said first bed;
(b) passing said solution through said first bed of activated alumina adsorbent to cause at least the chromium ions in said solution to be adsorbed by said activated alumina adsorbent;
(c) passing said solution through a second bed of activated alumina adsorbent which has not been acid treated to cause substantially all of the remainder of the heavy metal ions in said solution to be adsorbed by said second bed of activated alumina adsorbent;
(d) stripping said metal ions from each of said beds of activated alumina adsorbent to regenerate said adsorbent beds by passing through said adsorbent beds a solution containing from about 0.01 to about 5 wt. % of an alkali metal hydroxide; and
(e) recovering said metal stripped from said activated alumina adsorbent beds.

17. The process of claim 16 wherein said step of treating said first bed with acid comprises passing 1-10 bed volumes of a 0.01 to 1 molar acid through said first bed.

18. The process of claim 17 wherein said acid is selected from the class consisting of nitric, sulfuric, hydrochloric, carbonic, phosphoric, and hydrofluoric acid.

19. The process of claim 18 wherein said step of treating said first bed of activated alumina with acid comprises treating said activated alumina with 1-5 bed volumes of 0.1 molar nitric acid.

20. The process of claim 16 wherein said step of stripping said metal ions from each of said beds of activated alumina adsorbent to regenerate said adsorbent beds includes the further step of treating one of said adsorbent beds with acid after each stripping and regeneration cycle.

21. A process for purifying an aqueous solution containing chromium ions and one or more metals ions selected from the class consisting of antimony, arsenic, cadmium, copper, lead, mercury, nickel, selenium, silver, thallium, tin, and zinc by adsorbing the metal ions from the solution and recovering the metal which comprises:
(a) treating a first bed of activated alumina adsorbent with at least 1-5 bed volumes of from about 0.01 to 1 molar nitric acid to enhance the chromium adsorption capacity of said first bed;
(b) passing said solution through said first bed of activated alumina adsorbent to cause at least the chromium ions in said solution to be adsorbed by said activated alumina adsorbent;
(c) passing said solution through a second bed of activated alumina adsorbent which has not been acid treated to cause substantially all of the remainder of the heavy metal ions in said solution to be adsorbed by said second bed of activated alumina adsorbent;
(d) stripping said metal ions from each of said beds of activated alumina adsorbent to regenerate said adsorbent beds by passing through said adsorbent beds a solution containing from about 0.01 to about 1 wt. % of an alkali metal hydroxide; and
(e) treating one of said beds of activated alumina adsorbent with at least 1 bed volumes of from about 0.01 to 1 molar nitric acid after said stripping and regeneration step to renew the enhanced chromium adsorption capacity of said acid-treated bed.

22. The process of claim 21 wherein one of said activated alumina adsorbent beds is subjected to said acid treatment after each regeneration cycle to continue the enhanced adsorption of chromium ions by said acid-treated activated alumina bed.

23. An improved process for the purification of an impure aqueous solution containing chromate ions and other heavy metal ions which comprises:
(a) treating a bed of activated alumina adsorbent with acid to enhance the chromium adsorption capacity of said bed; and
(b) passing said solution through said acid-treated activated alumina adsorbent bed to cause said chromate ions to be removed from the impure aqueous solution by adsorption onto said acid treated activated alumina adsorbent.

24. The process of claim 23 said activated alumina is characterized by a surface area above 200 $m^2/g$, pore volume above 0.4 cc/g, and an average pore diameter of 60-100 Angstroms which has been activated by heatnng to a temperature of about 450° C.

25. The process of claim 23 wherein said step of treating said activated alumina adsorbent with acid further comprises treating said activated alumina with an acid selected from the class consisting of nitric, sulfuric, hydrochloric, carbonic, phosphoric,and hydrofluoric acid.

26. The process of claim 23 including the further step of passing said impure aqueous liquid through a bed of activated alumina which has not been treated with said acid, whereby substantially all of said chromate ions will be adsorbed in said acid-treated activated alumina adsorption bed and substantially all of the heavy metal ions not adsorbed in said acid-treated alunina bed will be adsorbed in said untreated alumina bed.

27. A process for purifying an aqueous solution containing chromium ions and one or more metals ions selected from the class consisting of antimony, arsenic, beryllium, cadmium, copper, lead, mercury, nickel, selenium, silver, thallium, tin, and zinc by adsorbing the metal ions from the solution and recovering the metal which comprises:
(a) treating a first bed of activated alumina adsorbent with acid to enhance the chromium adsorption capacity of said first bed;
(b) passing said solution through said first bed of activated alumina adsorbent to cause at least the chromium ions in said solution to be adsorbed by said activated alumina adsorbent;
(c) passing said solution through a second bed of activated alumina adsorbent which has not been acid treated to cause substantially all of the metal ions remaining in said solution to be adsorbed by said second bed of activated alumina adsorbent; and
(d) periodically stripping said metal ions from each of said beds of activated alumina adsorbent to regenerate said adsorbent beds by passing through said adsorbent beds a stripping solution selected from the class consisting of an alkali metal hydroxide and an alkali metal carbonate.

* * * * *